United States Patent
Douglas et al.

(10) Patent No.: US 11,704,777 B2
(45) Date of Patent: Jul. 18, 2023

(54) ARBITRARY MOTION SMEAR MODELING AND REMOVAL

(71) Applicant: Raytheon Company, Waltham, MA (US)

(72) Inventors: Dave S. Douglas, Marina Del Rey, CA (US); Jingning Pan, Tuscon, AZ (US); Alexandra G. Levinson, Cooper City, FL (US)

(73) Assignee: Raytheon Company, Waltham, MA (US)

( * ) Notice: Subject to any disclaimer, the term of this patent is extended or adjusted under 35 U.S.C. 154(b) by 26 days.

(21) Appl. No.: 17/460,048

(22) Filed: Aug. 27, 2021

(65) Prior Publication Data
US 2023/0061085 A1    Mar. 2, 2023

(51) Int. Cl.
*G06T 5/00* (2006.01)
*G06T 5/50* (2006.01)
*G06T 5/10* (2006.01)
*H04N 23/68* (2023.01)

(52) U.S. Cl.
CPC ............. *G06T 5/003* (2013.01); *G06T 5/10* (2013.01); *G06T 5/50* (2013.01); *H04N 23/683* (2023.01); *H04N 23/6812* (2023.01); *G06T 2207/10016* (2013.01); *G06T 2207/20201* (2013.01)

(58) Field of Classification Search
None
See application file for complete search history.

(56) References Cited

U.S. PATENT DOCUMENTS

| | | | |
|---|---|---|---|
| 7,733,393 B2 | 6/2010 | Yoshida et al. | |
| 8,040,407 B2 | 10/2011 | Hirai | |
| 8,237,827 B2 | 8/2012 | Yu et al. | |
| 9,143,687 B2 | 9/2015 | Hirakawa et al. | |
| 9,749,534 B2 | 8/2017 | Martinello | |
| 2006/0232692 A1 | 10/2006 | Takane | |
| 2007/0258706 A1* | 11/2007 | Raskar | H04N 5/23248 348/E5.037 |
| 2008/0062287 A1* | 3/2008 | Agrawal | G03B 17/00 348/E5.037 |

(Continued)

FOREIGN PATENT DOCUMENTS

| | | |
|---|---|---|
| CN | 102812496 A | 12/2012 |
| CN | 109636731 A | 4/2019 |

(Continued)

*Primary Examiner* — James M Hannett
(74) *Attorney, Agent, or Firm* — Locke Lord LLP; Joshua L. Jones; Scott D. Wofsy

(57) ABSTRACT

A method of de-smearing an image includes capturing image data from an imaging sensor and collecting motion data indicative of motion of the sensor while capturing the image data. The motion data is collected at a higher frequency than an exposure frequency at which the image data is captured. The method includes modeling motion of the sensor based on the motion data, wherein motion is modeled at the higher frequency than the exposure frequency. The method also includes modeling optical blur for the image data, modeling noise for the image data, and forming a de-smeared image as a function of the modeled motion, the modeled blur, and the modeled noise, and the image data captured from the imaging sensor.

14 Claims, 2 Drawing Sheets

(56) References Cited

U.S. PATENT DOCUMENTS

| | | | | |
|---|---|---|---|---|
| 2009/0244300 A1* | 10/2009 | Levin | ................ | G03B 17/00 |
| | | | | 348/208.5 |
| 2011/0069204 A1 | 3/2011 | Vakrat et al. | | |
| 2013/0235220 A1* | 9/2013 | Williams | ........... | H04N 5/23264 |
| | | | | 348/208.1 |
| 2015/0334304 A1* | 11/2015 | Gavant | ............. | H04N 5/23277 |
| | | | | 348/208.1 |
| 2017/0041545 A1* | 2/2017 | Murgia | ............. | H04N 5/23258 |
| 2019/0139199 A1 | 5/2019 | Wang et al. | | |

FOREIGN PATENT DOCUMENTS

| | | |
|---|---|---|
| CN | 110517197 A | 11/2019 |
| CN | 110677556 A | 1/2020 |
| EP | 3032821 A1 | 6/2016 |
| WO | 2019/148739 A1 | 8/2019 |
| WO | 2019/184393 A1 | 10/2019 |

* cited by examiner

ARBITRARY MOTION SMEAR MODELING AND REMOVAL

BACKGROUND

1. Field

The present disclosure relates to imaging, and more particularly to systems and methods for de-smearing images.

2. Description of Related Art

When an imaging sensor moves while forming images, the images can lose quality and utility due to sensor smear. Motion smear or motion blur is a common problem in the imaging industry. Therefore, many solutions have been developed. Traditional techniques for removing smear or de-smearing the image data from such images utilize line and circle motion models. Such de-smearing methods can mitigate the problem for certain circumstances, but cannot successfully remove more complicated motion smears.

The conventional techniques have been considered satisfactory for their intended purpose. However, there is an ever present need for improved systems and methods for de-smearing images with sensor smear. This disclosure provides a solution for this need.

SUMMARY

A method of de-smearing an image includes capturing image data from an imaging sensor and collecting motion data indicative of motion of the sensor while capturing the image data. The motion data is collected at a higher frequency than an exposure frequency at which the image data is captured. The method incudes modeling motion of the sensor based on the motion data, wherein motion is modeled at the higher frequency than the exposure frequency. The method also includes modeling optical blur for the image data, modeling noise for the image data, and forming a de-smeared image as a function of the modeled motion, the modeled blur, and the modeled noise, and the image data captured from the imaging sensor.

The motion data can be arbitrary in six axes in direction, speed, and path. Modeling motion can include using the motion data as a series of unit impulses at a sampling rate of the motion data to model motion smears in the image data. The method can include decaying amplitudes of the series of unit impulses with a sensor thermal time constant to form a smear kernel. Forming the de-smeared image can include calculating total blur as a product of the smear kernel and an optical blur of the imaging sensor, e.g. in the Fourier transform. Forming the de-smeared image can include applying the formula:

$$\hat{F}(u, v) = \left[ \frac{H^*(u, v)}{|H(u, v)|^2 + \gamma |P(u, v)|^2} \right] G(u, v)$$

where $\hat{F}(u,v)$ represents the de-smeared image, $H(u,v)$ represents the total blur, $H^*(u,v)$ is a conjugate Fourier transform of the total blur, $\gamma$ is a parameter that can be adjusted for different applications, $P(u,v)$ is the Fourier transform of the function $$P(u, v) = \begin{bmatrix} 0 & -1 & 0 \\ -1 & 4 & -1 \\ 0 & -1 & 0 \end{bmatrix}$$

and $G(u,v)$ represents the image data. Modeling motion can include using a series of unit impulses with a motion sensor sampling rate to model motion smears according to:

$$x(i-j)=x(i)+\Sigma_{n=i+1}^{j}(\text{yaw}(n)-\text{yaw}(n-1))/IFOV$$

$$y(i-j)=y(i)+\Sigma_{n=i+1}^{j}(\text{pitch}(n)-\text{pitch}(n-1))/IFOV$$

where (x(i),y(i)) is a smeared pixel, i is sensor time, and yaw(t) and pitch(t) are yaw and pitch values from the motion sensor at a given time t. Forming the de-smeared image can include transforming the motion data and the image data into a frequency domain, operating on transformed image data and transformed motion data, and reversing transforming back out of the frequency domain.

The method can include outputting the de-smeared image to a user including at least one of displaying the de-smeared image on a display and/or printing a hard copy of the de-smeared image. The method can include analyzing the de-smeared image and using results from analyzing the de-smeared image to direct a physical resource to move based on information in the de-smeared image, including at least one of guiding a munition to a target in the de-smeared image, directing an imaging platform to reposition to obtain further images of a target in the de-smeared image, and/or maneuvering a surface vehicle relative to a target in the de-smeared image.

Collecting image data can include collecting a sequence of exposures as video data at a frame rate, wherein collecting motion data indicative of motion of the sensor includes collecting image data is collected at a higher frequency than the frame rate, wherein motion is modeled at the higher frequency than the frame rate, and wherein forming the de-smeared image includes forming a series of de-smeared images as a de-smeared video.

An imaging system includes an imaging sensor operative to capture image data indicative of a scene. A motion sensor is operative to create motion data indicative of motion of the imaging sensor. A de-smear processor is operatively connected to receive the image data from the image sensor and to receive the motion data from the motion sensor. The de-smear processor includes machine readable instructions configured to cause the de-smear processor to carry out methods as described above. The system can include an output device operatively connected to the de-smear processor to output the de-smeared image to a user including at least one of displaying the de-smeared image on a display and/or printing a hard copy of the de-smeared image.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
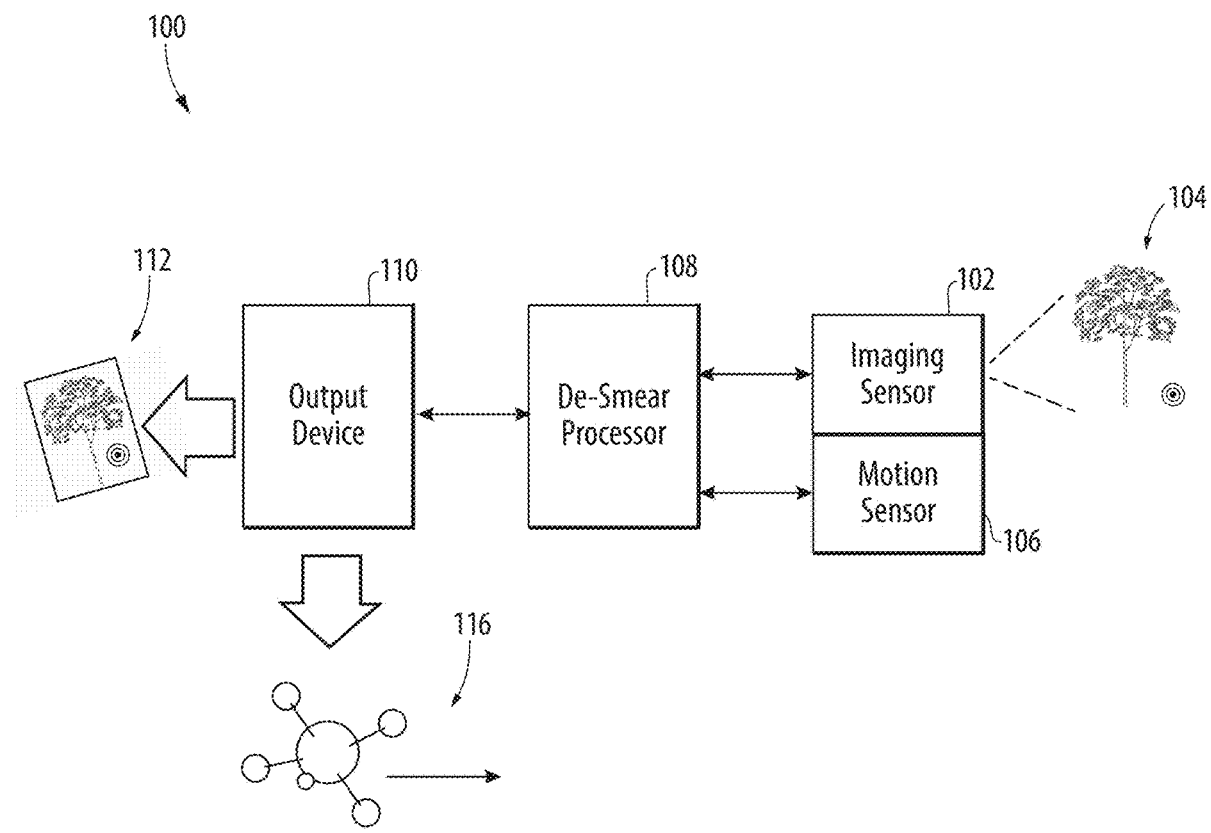
FIG. 1 is a schematic view of an embodiment of a system constructed in accordance with the present disclosure, showing the imaging sensor, the motion sensor, and the de-smear processor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to de-smear images from moving images sensors, where the motion is arbitrary and is at a higher frequency than the imaging exposure time or frame rate.

The imaging system 100 includes an imaging sensor 102 operative to capture image data indicative of a scene 104. A motion sensor 106 is operative to create motion data indicative of motion of the imaging sensor 102 while the imaging sensor is capturing the image data. A de-smear processor 108 is operatively connected to receive the image data from the image sensor 102 and to receive the motion data from the motion sensor 106. The de-smear processor 108 includes machine readable instructions configured to cause the de-smear processor to carry out methods as described below. The system 100 can include an output device 110 operatively connected to the de-smear processor 108 to output the de-smeared image 112 to a user including at least one of displaying the de-smeared image 112 on a display and/or printing a hard copy of the de-smeared image 112. Instead of displaying or printing the de-smeared image 112, it is also contemplated that the output device 110 can be a communication device connectable to physical resources such as described below, e.g. to redirect a drone 116, steer an automobile, or the like, based on information or targets in the de-smeared image 112.

Figure 2:
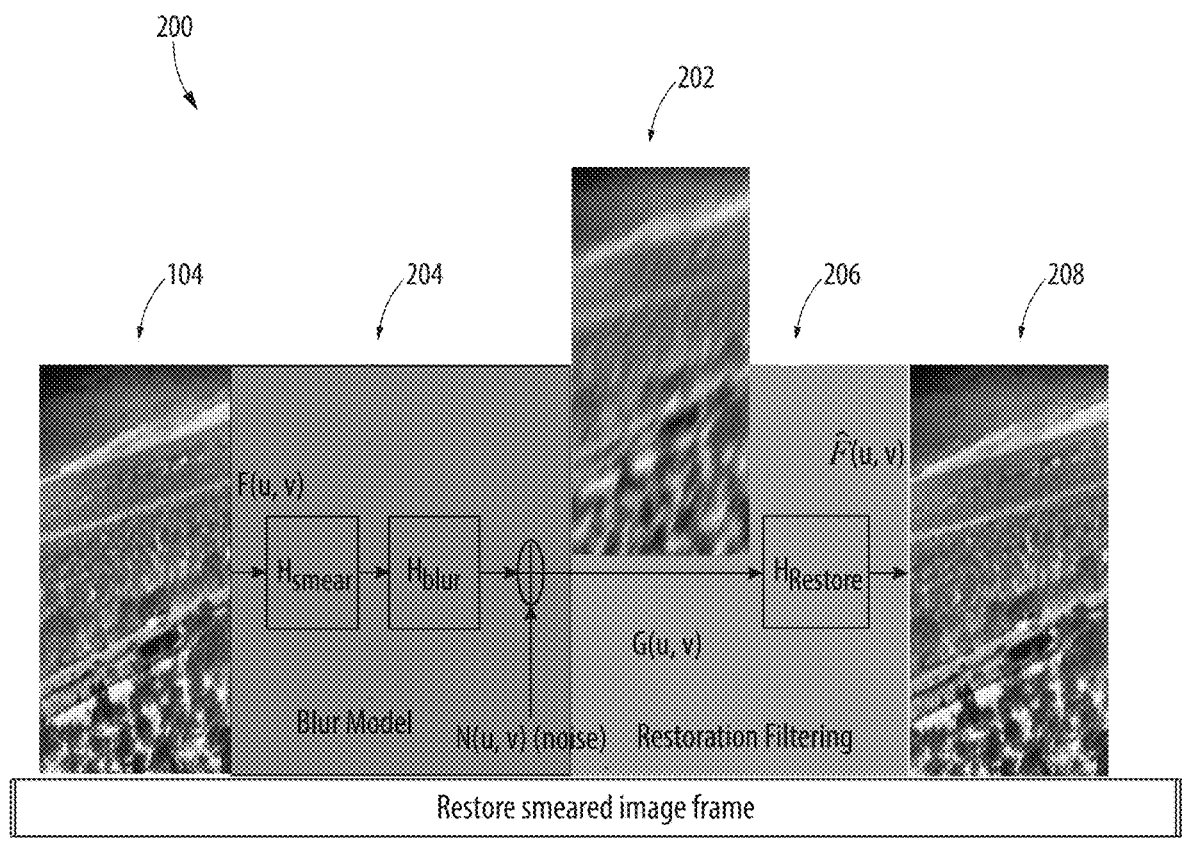
FIG. 2 is a schematic view of a method in accordance with the present disclosure, showing a process for de-smearing images.

With reference now to FIG. 2, a method 200 of de-smearing an image includes capturing image data, represented by image 202 in FIG. 2 also represented as G(u,v) herein, from an imaging sensor (e.g. sensor 102 in FIG. 1). The smeared image 202 represents the scene 104, but due to motion blur, the image data is blurred in the resulting image 202.

The method 200 includes collecting motion data (e.g. using sensor 106 in FIG. 1) indicative of motion of the imaging sensor while capturing the image data. The motion data is collected at a higher frequency than an exposure frequency or frame rate at which the image data is captured, i.e. the motion data is sampled at a higher frequency than the exposure frequency but can include a range of high and low frequency motion data. The motion data is arbitrary or non-constant in six axes in direction, speed, and path.

The method incudes modeling motion of the sensor based on the motion data, wherein motion is modeled at the higher frequency than the exposure frequency, as represented by the blur model box 204 in FIG. 2. The component of the total blur model representing the modeled motion blur F(u,y) or $H_{smear}$ and sensor blur $H_{blur}$ is represented as $H_{total}$ herein. Suppose that an image f(x, y) undergoes planar motion and x0(t) and y0(t) are time varying components of motion in the x- and y-direction. g(x, y) is a degraded image. Motion smear processing of g(x,y) can be represented by:

$$g(x,y) = \int_0^T f[x-x0(t), y-y0(t)] dt$$

where T is the duration of the camera exposure. If the image is digital it can be assumed that between image frames image intensity is time invariant except for the planar motion. Then $$\int_0^T f[x-x_0(t), y-y_0(t)] dt = \iint_{-\infty}^{\infty} f(x_{0(t)}, y_{0(t)}) \delta(x-x_0(t), y-y_0(t)) dx_0(t) dy_0(t)$$

Therefor the motion smear process can be stated by a convolution between truth image f(x, y) and a two-dimensional unit impulse series, $$\delta(x-x_0(t), y-y_0(t)).$$

Using Fourier transform, the degraded image can be expressed as: G(u, v)=H(u, v)F(u, v). If we only consider motion smear, $\delta(x-x_0(t), y-y_0(t))$ is a smear kernel and its Fourier transform H(u, v) is the smear kernel in Frequency domain.

The smear kernel is a 2-D weighted unit impulse series because we assume image intensity is time invariance:

$$(1/L)*\delta(x(i)-x(i-j), y(i)-y(i-j)), (x(i), y(i))\text{-smeared pixel}, j=1,2,\ldots,L$$

where L is the smear length. This series represents the motion path, or smearing path. If the platform (or imaging sensor) motion is a linear motion and its velocity is variant, its smear path can be described by a series of unit impulses. Because the magnitude and direction of motion velocity are variant and pixel locations have been rounded, number of impulses will be different at each image location. The smear kernel is a spatial linear function. If the motion is rotational, the smear kernel is a spatial arc function. For the high sampling rate of an IMU (inertial measurement unit or motion sensor) or any continuous motion function, the smear kernel can be generated as:

$$\text{Smear Kernel} = (1/L)*\delta(x(i)-x(i-j), y(i)-y(i-j))$$

Figure 3:
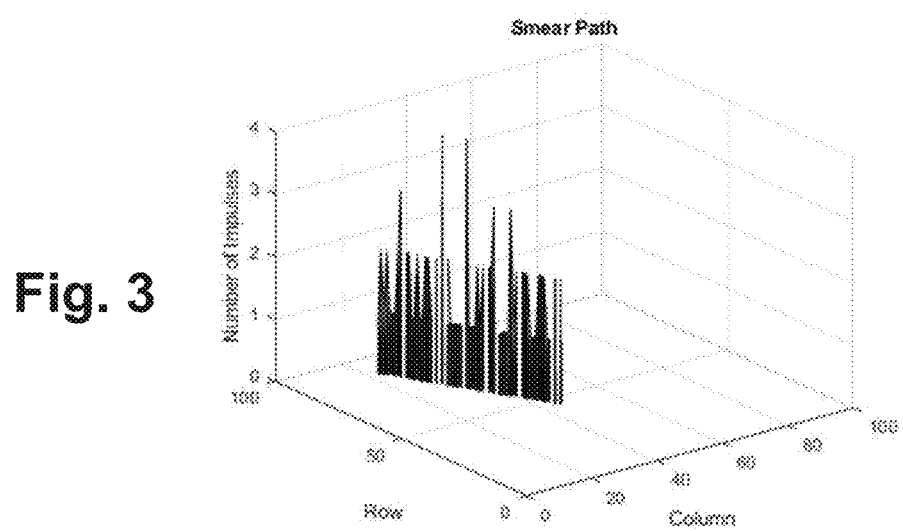
FIG. 3 is a three-dimensional plot of an example of a smear kernel in accordance with the present disclosure.

Previously, it was believed that x(i−j) and y(i−j)=1, 2, 3, 4, . . . , m, and that the smear kernel was constant and uniform, even if the smear path has an oscillation. As disclosed herein, the smear kernel can accurately present the oscillation and can appear as shown in FIG. 3. We can use a high frequency IMU or other motion sensor to measure an arbitrary motion path (x(t), y(t)), such as, arbitrary oscillation and variant motion speed and direction. We use a series of unit impulses with IMU sampling rate to model the motion smears:

$$x(i-j) = x(i) + \Sigma_{n=i+1}^{j}(\text{yaw}(n) - \text{yaw}(n-1))/IFOV$$

$$y(i-j) = y(i) + \Sigma_{n=i+1}^{j}(\text{pitch}(n) - \text{pitch}(n-1))/IFOV$$

where (x(i),y(i)) is a smeared pixel, i is sensor time, and yaw(t) and pitch(t) are yaw and pitch vales from the IMU or a motion sensor at a given time t.

Next, the smear path is decayed with the thermal time constant of the imaging sensor or camera as:

$$h_{smear}(j) = \frac{e^{-c(L-j)}}{L} \delta(x(i) - x(i-j), y(i) - y(i-j))$$

$$j = 1, 2, \ldots, L$$

The thermal time constant represents a sensor parameter that is in the camera or imaging system itself. It presents an issue whenever the camera is dynamically moving with respect to either an object or background in the scene content. This information becomes "blurred" with a decay type of integration where the latest information is the strongest and the older information has less influence on the resulting sampled image.

The blur model includes modeling optical blur for the image data, indicated as $H_{blur}$ in FIG. 2, which is applied to the motion blur $H_{smear}$. The blur model also includes modeling noise for the image data, indicated as N(u,v)(noise) in FIG. 2, and adding the modeled noise to the combined motion and optical blur models.

For total sensor blur, the smear kernel convolves with the sensor blur (this could also include the detector size/shape Hdet to remove the detector blur when oversampling the output and any atmospheric known turbulence motion of the local image as Hturb). The sense blur ($h_{blur}$) is the sensor point spread function (PSF).

$$h_{total} = h_{smear} \otimes h_{blur}$$

or $$H_{total}(u,v) = H_{smear}(u,v) H_{blur}(u,v)$$

As indicated by the restoration filtering box 206 in FIG. 2, the method includes forming a de-smeared image 208, also represented as $\hat{F}(u,v)$ herein, as a function of the modeled motion, the modeled blur, and the modeled noise. The blur model $H_{restore}$ is applied to the original image 202 to create the de-smeared image 208. Forming the de-smeared image includes calculating total blur as a product of the smear kernel $H_{smear}$ and the known optical blur $H_{blur}$ of the imaging sensor 104 (labeled in FIG. 1). Forming the de-smeared image includes applying the formula:

$$\hat{F}(u,v) = \left[ \frac{H^*(u,v)}{|H(u,v)|^2 + \gamma |P(u,v)|^2} \right] G(u,v)$$

where $\hat{F}(u,v)$ represents the de-smeared image, H(u,v) represents the total blur, H*(u,v) is a conjugate Fourier transform of the total blur, γ is a parameter that can be adjusted for different applications, P(u,v) is the Fourier transform of the function $$P(u,v) = \begin{bmatrix} 0 & -1 & 0 \\ -1 & 4 & -1 \\ 0 & -1 & 0 \end{bmatrix}$$

and G(u,v) represents the image data. Forming the de-smeared image includes reversing transforming $\hat{F}(u,v)$ back out of the frequency domain.

The method can include outputting, as indicated in FIG. 1 with output device 110 and image 112, the de-smeared image to a user including at least one of displaying the de-smeared image on a display and/or printing a hard copy of the de-smeared image. It is also contemplated that the method can include analyzing the de-smeared image and using results from analyzing the de-smeared image to direct a physical resource to move based on information in the de-smeared image, including at least one of guiding a munition to a target in the de-smeared image, directing an imaging platform to reposition to obtain further images of a target in the de-smeared image, and/or maneuvering a surface vehicle relative to a target in the de-smeared image, as also indicated in FIG. 1 with output device 110 and drone 116, which is representative of any guided device or resource that physically moves as a result of the information in the de-smeared image 208.

Collecting image data can include collecting a sequence of exposures as video data at a frame rate. In this case, collecting motion data indicative of motion of the sensor includes collecting image data is collected at a higher frequency than the frame rate, wherein motion is modeled at the higher frequency than the frame rate, and wherein forming the de-smeared image includes forming a series of de-smeared images as a de-smeared video.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this dis-closure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products ac-cording to embodiments of this disclosure. It will be understood that each block of any flowchart illustrations and/or block diagrams, and combinations of blocks in any flowchart illustrations and/or block diagrams, can be implemented by computer program instructions.

These computer program instructions may be provided to a processor of a general purpose computer, special purpose computer, or other programmable data processing apparatus to produce a ma-chine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be per-formed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed here-in can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

The methods and systems of the present disclosure, as described above and shown in the drawings, provide for de-smearing images from moving images sensors, where the motion is arbitrary and is at a higher frequency than the imaging exposure time or frame rate. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of de-smearing an image comprising:
   capturing image data from an imaging sensor;
   collecting motion data indicative of motion of the sensor while capturing the image data, wherein the motion data is collected at a higher frequency than an exposure frequency at which the image data is captured;
   modeling motion of the sensor based on the motion data, wherein motion is modeled at the higher frequency than the exposure frequency;
   modeling optical blur for the image data;
   modeling noise for the image data; and
   forming a de-smeared image as a function of the modeled motion, the modeled blur, and the modeled noise, and the image data captured from the imaging sensor, wherein the motion data is arbitrary in six axes in direction, speed, and path, wherein modeling motion includes using the motion data as a series of unit impulses at a sampling rate of the motion data to model motion smears in the image data, further comprising decaying amplitudes of the series of unit impulses with a sensor thermal time constant to form a smear kernel.

2. The method as recited in claim 1, wherein forming the de-smeared image includes calculating total blur as a product of the smear kernel and an optical blur of the imaging sensor.

3. The method as recited in claim 2, wherein modeling motion includes using a series of unit impulses with a motion sensor sampling rate to model motion smears according to:

$$x(i-j)=x(i)+\Sigma_{n=i+1}^{j}(\text{yaw}(n)-\text{yaw}(n-1))/IFOV$$

$$y(i-j)=y(i)+\Sigma_{n=i+1}^{j}(\text{pitch}(n)-\text{pitch}(n-1))/IFOV$$

where $(x(i),y(i))$ is a smeared pixel, i is sensor time, and yaw(t) and pitch(t) are yaw and pitch vales from the motion sensor at a given time t.

4. A method of de-smearing an image comprising:
capturing image data from an imaging sensor;
collecting motion data indicative of motion of the sensor while capturing the image data, wherein the motion data is collected at a higher frequency than an exposure frequency at which the image data is captured;
modeling motion of the sensor based on the motion data, wherein motion is modeled at the higher frequency than the exposure frequency;
modeling optical blur for the image data;
modeling noise for the image data; and
forming a de-smeared image as a function of the modeled motion, the modeled blur, and the modeled noise, and the image data captured from the imaging sensor, wherein forming the de-smeared image includes transforming the motion data and the image data into a frequency domain, operating on transformed image data and transformed motion data, and reversing transforming back out of the frequency domain.

5. The method as recited in claim 1, further comprising outputting the de-smeared image to a user including at least one of displaying the de-smeared image on a display and/or printing a hard copy of the de-smeared image.

6. The method as recited in claim 1, further comprising analyzing the de-smeared image and using results from analyzing the de-smeared image to direct a physical resource to move based on information in the de-smeared image, including at least one of guiding a munition to a target in the de-smeared image, directing an imaging platform to reposition to obtain further images of a target in the de-smeared image, and/or maneuvering a surface vehicle relative to a target in the de-smeared image.

7. The method as recited in claim 1, wherein collecting image data includes collecting a sequence of exposures as video data at a frame rate, wherein collecting motion data indicative of motion of the sensor while includes collecting image data is collected at a higher frequency than the frame rate, and wherein forming the de-smeared image includes forming a series of de-smeared images as a de-smeared video.

8. An imaging system comprising:
an imaging sensor operative to capture image data indicative of a scene;
a motion sensor operative to create motion data indicative of motion of the imaging sensor; and
a de-smear processor operatively connected to receive the image data from the image sensor and to receive the motion data from the motion sensor, wherein the de-smear processor includes machine readable instructions configured to cause the de-smear processor to:
collect motion data indicative of motion of the imaging sensor while capturing the image data, wherein the motion data is collected at a higher frequency than an exposure frequency at which the image data is captured;
model motion of the sensor based on the motion data, wherein motion is modeled at the higher frequency than the exposure frequency;
model optical blur for the image data;
model noise for the image data; and
form a de-smeared image as a function of the modeled motion, the modeled blur, and the modeled noise, and the image data captured from the imaging sensor, wherein the machine readable instructions are configured to cause the de-smear processor to model based on motion data that is arbitrary in direction in six axes in direction, speed, and path, wherein modeling motion includes using the motion data as a series if unit impulses at a sampling rate of the motion data to model motion smears in the image data, wherein the machine readable instructions are configured to cause the de-smear processor to decay amplitudes of the series of unit impulses with a sensor thermal time constant to form a smear kernel.

9. The system as recited in claim 8, wherein forming the de-smeared image includes calculating total blur as a product of the smear kernel and an optical blur of the imaging sensor.

10. The system as recited in claim 9, wherein modeling motion includes using a series of unit impulses with a motion sensor sampling rate to model motion smears according to:

$$x(i-j)=x(i)+\Sigma_{n=i+1}^{j}(\text{yaw}(n)-\text{yaw}(n-1))/IFOV$$

$$y(i-j)=y(i)+\Sigma_{n=i+1}^{j}(\text{pitch}(n)-\text{pitch}(n-1))/IFOV$$

where $(x(i),y(i))$ is a smeared pixel, i is sensor time, and yaw(t) and pitch(t) are yaw and pitch values from the motion sensor at a given time t.

11. An imaging system comprising:
an imaging sensor operative to capture image data indicative of a scene;
a motion sensor operative to create motion data indicative of motion of the imaging sensor; and
a de-smear processor operatively connected to receive the image data from the image sensor and to receive the motion data from the motion sensor, wherein the de-smear processor includes machine readable instructions configured to cause the de-smear processor to:
collect motion data indicative of motion of the imaging sensor while capturing the image data, wherein the motion data is collected at a higher frequency than an exposure frequency at which the image data is captured;
model motion of the sensor based on the motion data, wherein motion is modeled at the higher frequency than the exposure frequency;
model optical blur for the image data;
model noise for the image data; and
form a de-smeared image as a function of the modeled motion, the modeled blur, and the modeled noise, and the image data captured from the imaging sensor, wherein forming the de-smeared image includes transforming the motion data and the image data into a frequency domain, operating on transformed image data and transformed motion data, and reversing transforming back out of the frequency domain.

12. The system as recited in claim 8, further comprising an output device operatively connected to the de-smear processor to output the de-smeared image to a user including at least one of displaying the de-smeared image on a display and/or printing a hard copy of the de-smeared image.

13. The system as recited in claim 8, wherein the machine readable instructions are configured to cause the de-smear processor to analyze the de-smeared image and use results from analyzing the de-smeared image to direct a physical resource to move based on information in the de-smeared image, including at least one of guiding a munition to a target in the de-smeared image, directing an imaging platform to reposition to obtain further images of a target in the de-smeared image, and/or maneuvering a surface vehicle relative to a target in the de-smeared image.

14. The system as recited in claim 1, wherein collecting image data includes collecting a sequence of exposures as video data at a frame rate, wherein collecting motion data indicative of motion of the sensor while includes collecting image data is collected at a higher frequency than the frame rate, and wherein forming the de-smeared image includes forming a series of de-smeared images as a de-smeared video.

* * * * *